(12) United States Patent
Pohjalainen

(10) Patent No.: US 12,259,152 B2
(45) Date of Patent: Mar. 25, 2025

(54) RETROFITTABLE CONTROLLER OF EXHAUST-AIR BLOWER

(71) Applicant: ENTOS OY, Mikkeli (FI)

(72) Inventor: Aki Pohjalainen, Mikkeli (FI)

(73) Assignee: Entos Oy, Mikkeli (FI)

( * ) Notice: Subject to any disclaimer, the term of this patent is extended or adjusted under 35 U.S.C. 154(b) by 657 days.

(21) Appl. No.: 17/425,063

(22) PCT Filed: Jan. 24, 2020

(86) PCT No.: PCT/FI2020/050036
§ 371 (c)(1),
(2) Date: Jul. 22, 2021

(87) PCT Pub. No.: WO2020/152398
PCT Pub. Date: Jul. 30, 2020

(65) Prior Publication Data
US 2022/0099329 A1     Mar. 31, 2022

(30) Foreign Application Priority Data
Jan. 24, 2019    (FI) .................................. U20194010

(51) Int. Cl.
*F24F 11/89*     (2018.01)
*F24F 11/63*     (2018.01)
(Continued)

(52) U.S. Cl.
CPC .............. *F24F 11/89* (2018.01); *F24F 11/63* (2018.01); *F24F 11/77* (2018.01); *F24F 13/20* (2013.01);
(Continued)

(58) Field of Classification Search
CPC .................... F24F 11/89; F24F 13/20
See application file for complete search history.

(56) References Cited

U.S. PATENT DOCUMENTS 7,984,859 B2 * 7/2011 Goodwin ............. F24F 11/0008
236/46 C
2004/0041036 A1    3/2004 Acker
(Continued)

FOREIGN PATENT DOCUMENTS

FI         12255 U1    12/2018

OTHER PUBLICATIONS

Supplementary European Search Report in EP Application No. 20744561, mailed Sep. 6, 2022 (7 pages).

*Primary Examiner* — Allen R. B. Schult
(74) *Attorney, Agent, or Firm* — Leason Ellis LLP

(57) ABSTRACT

The application relates to a retrofittable controller (126) according to one embodiment for a building's exhaust air blower (100). The controller comprises a processor unit, a data transfer unit, and a memory unit. The controller further comprises a sensor unit with at least one sensor for measuring the exhaust air arriving at the exhaust air blower, and a control unit which is adapted to regulate operation of a fan motor on the basis of a measurement conducted by the at least one sensor. The controller further comprises a protective housing (125) inside which the controller's units are installed and an attachment element (160) for fastening the controller to a safety cage (102) of the exhaust air blower. The protective housing comprises an air inlet duct, which protrudes therefrom and is intended to be fitted inside the exhaust air blower's safety cage (102), and by means of which a portion of the exhaust air arriving at the exhaust air blower is conducted into the protective housing to be analyzed by the sensor unit.

8 Claims, 2 Drawing Sheets

(51) Int. Cl.
*F24F 11/77* (2018.01)
*F24F 13/20* (2006.01)
*F24F 110/10* (2018.01)
*F24F 110/20* (2018.01)
*F24F 110/50* (2018.01)

(52) U.S. Cl.
CPC ..... *F24F 2013/207* (2013.01); *F24F 2110/10* (2018.01); *F24F 2110/20* (2018.01); *F24F 2110/50* (2018.01)

(56) References Cited

U.S. PATENT DOCUMENTS

| | | |
|---|---|---|
| 2010/0006661 A1 | 1/2010 | Goodwin et al. |
| 2012/0052791 A1 | 3/2012 | Kurelowech |
| 2013/0105136 A1* | 5/2013 | Chen .................. H01L 23/467 165/200 |
| 2016/0348939 A1 | 12/2016 | Davis, II et al. |
| 2018/0299150 A1 | 10/2018 | Ajax et al. |

* cited by examiner

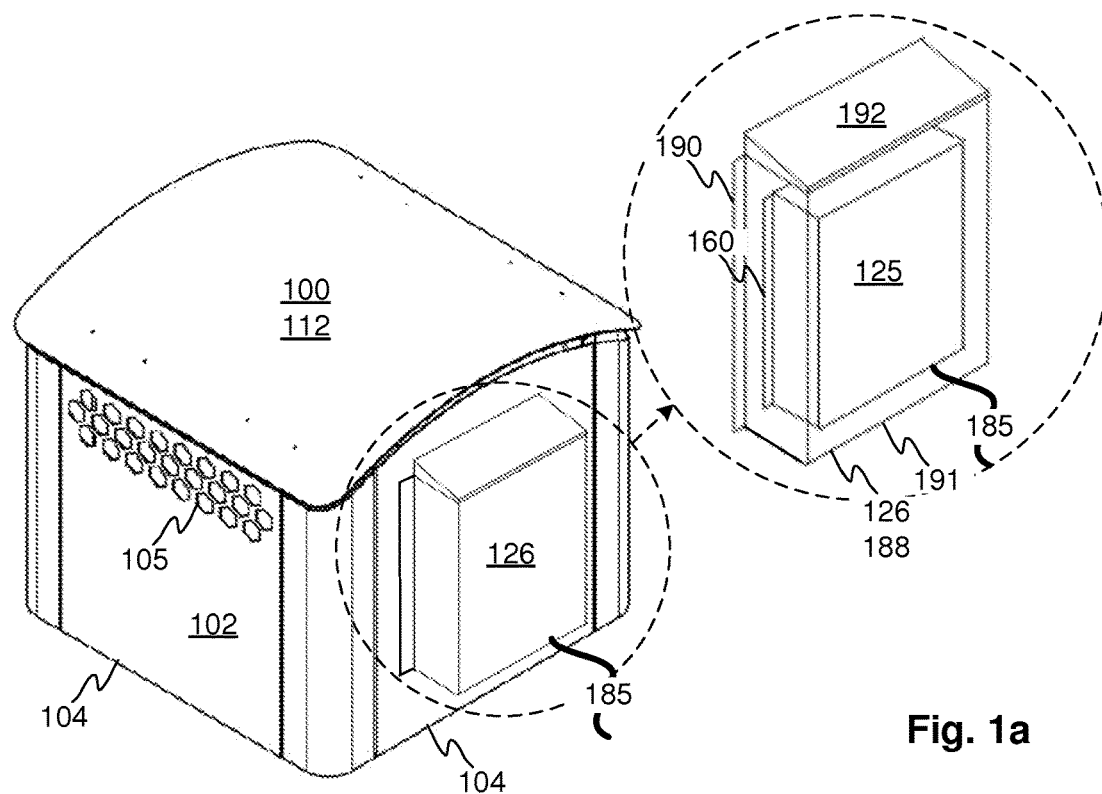
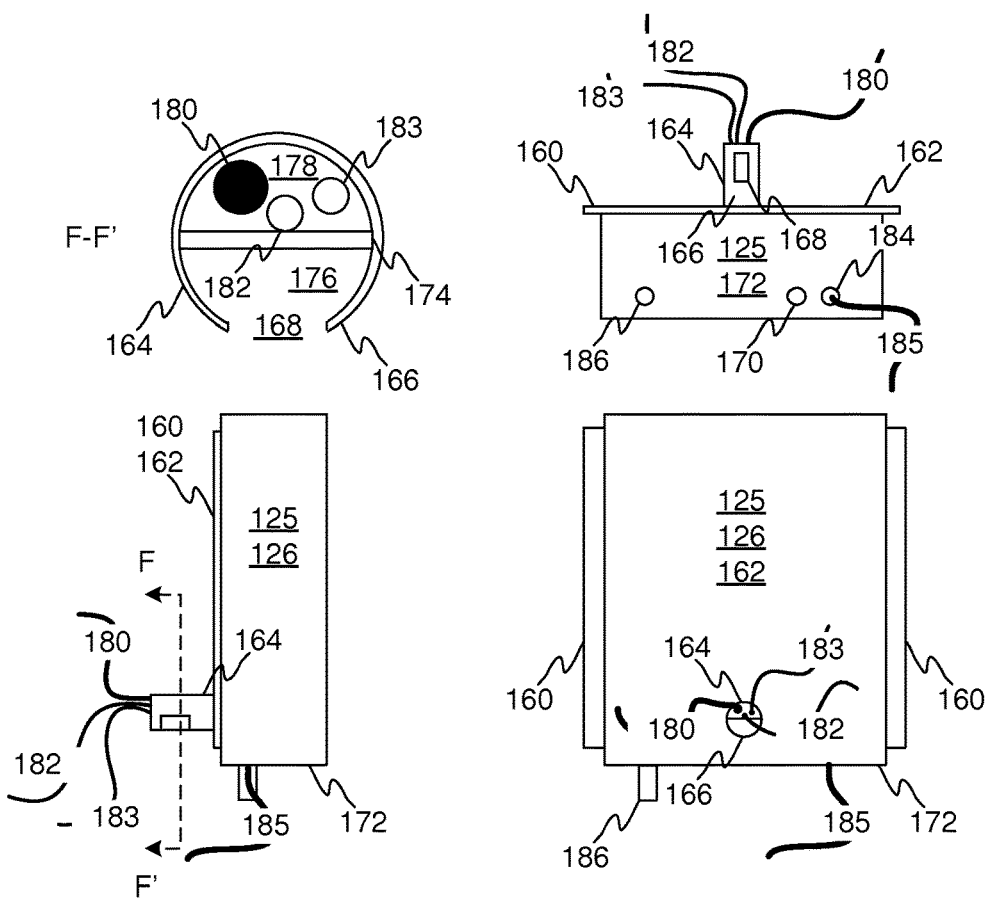
Fig. 1a
Fig. 1b

RETROFITTABLE CONTROLLER OF EXHAUST-AIR BLOWER

CROSS-REFERENCE TO RELATED PATENT APPLICATIONS

This application is a U.S. National Phase Application under 35 U.S.C. § 371 of International Patent Application No. PCT/FI2020/050036, filed Jan. 24, 2020, which claims priority to FI Application No. U20194010, filed Jan. 24, 2019, all of which are incorporated by reference, as if expressly set forth in their respective entireties herein.

TECHNICAL FIELD

The application relates generally to a retrofittable controller for a building's exhaust air blower.

BACKGROUND

The most popular mode of ventilation in buildings, e.g. apartment buildings, from 1960s to 2000s has been mechanical exhaust ventilation.

In the mechanical exhaust ventilation system of apartment buildings, it is by means of an exhaust air blower fitted in connection with an exhaust air duct that indoor air is discharged by way of apartment-specific exhaust air valves into the exhaust air duct along which the air removed from interior spaces is then conveyed to the apartment building's roof.

As the exhaust air blower is removing air from apartments, the latter develop a negative pressure, it being by virtue of the negative pressure that the fresh make-up air, replacing the air that is being removed, enters the apartments either in a controlled manner by way of fresh air valves or in an uncontrolled manner through the apartment building's structures.

The exhaust air blowers operate usually at two speeds and with timer control. Thus, the timer-controlled exhaust air blower is working at half or full capacity depending on the assessed utilization rate of an apartment building.

SUMMARY

One objective of the invention is to solve problems of the prior art and to provide a retrofittable exhaust air blower controller, enabling an old exhaust air blower to be converted into a smart exhaust air blower. It is by virtue of intelligence added to an exhaust air blower that the exhaust air blower enables implementation of need-adapted ventilation on the basis of measurement data indicated by sensors, thereby preventing e.g. the ventilation-induced loss of heat energy, improving the comfort of living, enhancing safety in apartments, eliminating the feeling of draft from apartments, enabling nocturnal summertime ventilations in apartments, improving fire safety and eliminating the mechanical sounds of exhaust air fans.

One objective of the invention is attained with a retrofittable exhaust air blower controller, a control method, a computer program, and a computer program product according to the independent claims.

The retrofittable controller according to one embodiment for a building's exhaust air blower comprises a processor unit, a data transfer unit, and a memory unit. The controller further comprises a sensor unit, comprising at least one sensor for measuring the exhaust air arriving at the exhaust air blower, and a control unit which is adapted to regulate operation of a fan motor on the basis of a measurement conducted by at least one sensor. The controller further comprises a protective housing inside which the controller's units are installed, and an attachment element for fastening the controller to a safety cage of the exhaust air blower. The protective housing comprises an air inlet duct, which protrudes therefrom and is intended to be fitted inside the exhaust air blower's safety cage, and by means of which a portion of the exhaust air arriving at the exhaust air blower is conducted into the protective housing to be analyzed by the sensor unit.

The control method according to one embodiment for a building's exhaust air blower is implemented with a controller according to the previous embodiment. The method comprises a step of measuring, with at least one sensor of a sensor unit (224), the exhaust air arriving at the exhaust air blower. The method further comprises a step of regulating, with a control unit, the operation of a controller-coupled fan motor of the exhaust air blower on the basis of a measurement conducted by at least one sensor.

The computer program according to one embodiment intended for controlling a building's exhaust air blower comprises instructions which enable a computer to execute steps of the method according to the previous embodiment as the program is run on the computer.

The computer program product according to one embodiment intended for controlling a building's exhaust air blower comprises the computer program according to the previous embodiment stored therein.

Other embodiments are presented in the dependent claims.

BRIEF DESCRIPTION OF THE FIGURES

Exemplary embodiments of the invention will now be described more precisely with reference to the accompanying figures:

FIG. 1*a* shows an exhaust air blower provided with a retrofittable controller

FIG. 1*b* shows the controller in views from behind, side and below, as well as a cross-section of the air inlet duct

DETAILED DESCRIPTION OF THE FIGURES

Figure 2:
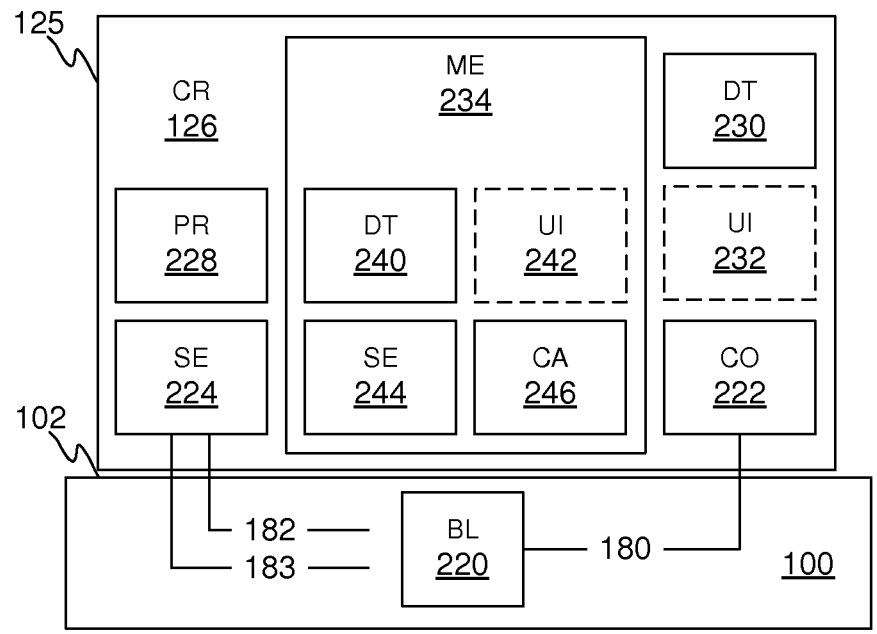
FIG. 2 shows the controller's and exhaust air blower's functional units

FIG. 1*a* shows an exhaust air blower (roof extractor) 100, which is capable of being fitted in a ventilation pipe for the exhaust air duct of a building 351, e.g. an apartment building or a row house, and which is updated for smartness by retrofitting it with a controller (control unit) 126 for a fan motor 220.

The exhaust air blower 100 is mounted on the end of an exhaust air duct extended from interior spaces of the building 351 up to its roof, whereby the removable air leaves the building 351 by way of the exhaust air blower 100.

The exhaust air blower 100 has a safety cage (outlet diffuser) 102 with a function of protecting components 220 therein from the effect of weather and mechanical impacts. The safety cage 102 is fabricated from thin sheet metal whose material is e.g. aluminum and/or steel.

The safety cage 102 comprises side members 104, a bottom plate attached to the lower part thereof and provided with a penetration hole for a ventilation pipe, and a lid 112.

In an exhaust air blower 100 as shown in the figure, the exhaust air discharges from the safety cage by way of air vents 105 in the side members 104 as well as by way of a gap between a top edge of the side members 104 and the lid 112. There are also other types of options for conducting exhaust air out of the exhaust air blower 100, depending on the type of blower.

FIG. 1b shows more precisely the controller 126, which is mounted e.g. on an external surface of any side member 104 of the safety cage 102 as shown in the figure. On a bottom right-hand edge of the figure, the controller 126 is shown in a view from the direction of a rear surface 162, on a top right-hand edge from the direction of a bottom 172, and on a bottom left-hand edge from the direction of the right side. On a top left-hand edge is shown an air inlet duct 164 in a cross-section F-F'.

The controller 126 is provided with a protective housing 125 with a function of protecting the controller's 126 units 222, 224, 228, 230, 232, 234 from the effects of weather and dirt as well as from mechanical impacts. Fabrication material for the protective housing 125 comprises e.g. plastic or steel.

The protective housing 125 comprises (includes) an attachment element 160 by means of which the controller 126 is fastened to the safety cage 102. The attachment element 160 is made up e.g. by edge strips 160 provided along the sides of the protective housing 125, the attachment made therethrough being used for fastening the protective housing 125 to the safety cage 102.

The protective housing 125 comprises an air inlet duct 164, which is provided on its rear surface 162 intended to be set against the safety cage 102, and which is protruding and intended to be fitted inside the safety cage 102, and for which the safety cage 102 must be formed with a sufficiently large opening (not shown) for inserting the air inlet duct 164 into an interior of the safety cage 102. It is by means of the air inlet duct 164 that a portion of the exhaust air arriving at the exhaust air blower 100 is directed into an interior of the protective housing 125 of the controller 126, where the sensors of the sensor unit 224 are able to conduct measurements thereof and, on the basis of measurement results, to analyze, based on the value and behavior of a measured quantity, the effect thereof on a demand of control for the fan motor 220.

The air inlet duct 164 is a hollow, e.g. tubular, rectangular or polygonal passage whose bottom surface 166 comprises an air intake 168, by way of which the analysis-bound exhaust air, to be obtained (captured) from an exhaust air flow, is capable of being directed into the air inlet duct 164 and along the same into an interior of the protective housing 125. The protective housing 125 has a discharge outlet 170, e.g. in a bottom 172 of the protective housing, for removing the analyzed air from inside the protective housing 125.

The air inlet duct 164 is split with a dividing element (divider) 174 in such a way that the air inlet duct 164 has its lower part, on the side of the air intake 168, making up an air inlet section 176 intended for conveying the analysis-bound exhaust air into an interior of the protective housing 125. On the other hand, the air inlet duct 164 has its upper part making up a cable section 178 for extending into an interior of the safety cage 102 at least a connection cable (control cable) 180 for controlling the fan motor 220.

It is also possible to extend measuring tubes 182, 183 from the installed controller 126 along the cable section 178, which tubes are used e.g. in measuring a pressure difference between an inlet chamber and an inlet cone of the exhaust air blower 100 and the first of which is placed to measure an intake pressure of the inlet chamber and the second an intake pressure of the inlet cone.

The protective housing 125 comprises an opening 184, e.g. in its bottom 172, for extending a voltage supply cable 185 for connection out of the controller 126, and e.g. from its side or, as shown in the figure, from its bottom 172 protrudes a temperature sensor 186, included in the sensor unit 224, for a measurement of outdoor temperature. The protective housing 125 may also have its side or bottom 172 provided with a pressure sensor, included in the sensor unit 224, for a measurement of outdoor air pressure.

The controller 126 comprises a shielding shell 188 attachable to the safety cage 102 and mountable on top of the protective housing 125 with a function of ensuring the working ability of the controller 126 by keeping, contingent on weather conditions, the ambient air sufficiently warm or cool and sufficiently dry, as well as protecting the controller 126 covered by the shielding shell 188 from the effects of weather and dirt, and from mechanical impacts. Fabrication material for the shielding shell 188 comprises e.g. plastic or metal.

The shielding shell 188 is made up by edge strips 190 provided e.g. along its sides, the attachment made therethrough being used for fastening the shielding shell 188 to the safety cage 102.

The shielding shell 188 must be installed on the safety cage 102 so as to cover the protective housing 125 and an opening (not shown) made in the safety cage 102 and not concealed by the protective housing 125. It is by way of this opening that a space between the protective housing 125 and the shielding shell 188 is supplied from inside the exhaust air blower 100 with exhaust air which, in hot, cold or damp weather, maintains the surroundings of the controller 126 sufficiently cool, warm or dry. The shielding shell 188 comprises at least one adjustable air vent (not shown), e.g. in its lower part or bottom 191, for removing, from inside the shielding shell 188, the air flowing between the protective housing 125 and the shielding shell 188.

The shielding shell 188 has a roofing 192 along which water and snow-turned-water trickle away from top of the shielding shell 188.

FIG. 2 shows the functional units 220, 222, 224, 228, 230, 232, 234 of the exhaust air blower 100 and the controller 126.

Inside the safety cage 102 of the exhaust air blower 100 is installed a fan motor 220 with a function of extracting the air to be removed from apartments into an exhaust air duct and along the same, by way of a ventilation pipe fitted in a penetration hole of the exhaust air blower 100, into an interior of the exhaust air blower 100 in which the air to be removed is blown by the fan motor 220 through the structure of the exhaust air blower 100 out of the building 351. The fan motor 220 is installed in the middle of a space defined by the structures of the safety cage 102.

It is a function of the controller 126 to upgrade the exhaust air blower 100 into a smart device by analyzing, on the basis of a measurement conducted by at least one sensor of the sensor unit 224 at its disposal, a demand of control for the fan motor 220 and, if necessary, to direct a control unit 222 to manage operation of the fan motor 220.

Inside the protective housing 125 of the controller 126 is installed a control unit 222, a sensor unit 224 used in assistance of control, and other functional units 228, 230, 232, 234. The control unit 222 is coupled with the fan motor 220 by way of a connection cable 180.

The control unit 222, intended for managing the fan motor 220 present in the protective housing 125, has a function of its control automation to regulate the output power of the fan motor 220 in keeping with guidance received thereby.

The sensor unit 224 housed in the protective housing 125 has at least one sensor, a measurement conducted thereby on exhaust air arriving at the exhaust air blower 100 being used as a basis for directing automation of the control unit 222 to regulate operation of the fan motor 220. At least one sensor of the sensor unit 224 can also be used for conducting measurements on outdoor air surrounding the exhaust air blower 100 and the controller 126. The sensor unit 224 comprises at least one of the following sensors: a temperature sensor measuring the temperature of exhaust air, a temperature sensor 186 measuring the temperature of outdoor air, a humidity sensor measuring the humidity of exhaust air, a sensor measuring the carbon dioxide content of exhaust air, a sensor measuring the VOC gas level of exhaust air, a sensor measuring the pressure of outdoor air, and sensors measuring the intake pressure of exhaust air with measuring tubes 182, 183 thereof being extended into an interior of the safety cage 102 and measuring date produced thereby also enabling the amount of air to be determined.

The controller 126 comprises a processor unit 228, enabling instructions determined by a user or some application program to be executed and data to be processed.

The controller 126 further comprises a data transfer unit 230, by means of which the controller 126 receives data over a wireless communication link from outside the exhaust air blower 100 (controller 126) and transmits data over a wireless connection away from the exhaust air blower 100 (controller 126). The data transfer unit 230 comprises e.g. a wireless 3G/4G network section, by means of which the controller 126 communicates with a device external of the exhaust air blower 100.

The controller 126 may comprise a physical user interface unit 232, by means of which the user is able to deliver commands and information and/or to receive information. The user interface unit 232 is e.g. a communication interface, to which it is possible to connect by means of a connection cable e.g. an external computer, a user interface equipped with a display and keyboard, or a smart device equipped with a touchscreen.

The controller 126 further comprises a memory unit 234 for filing and storing applications and data. The memory unit 234 may comprise at least one memory, e.g. one, two or three memories.

The memory unit 234 may comprise a data transfer application 240 controlling operation of the data transfer unit 230, a user interface application 242 controlling operation of the user interface unit 232, an analyzing application 244 intended for processing data coming from the sensor unit 224, and a control application 246 intended for controlling the control unit 222 which regulates operation of the fan motor 220.

Internal communication required by the controller 126 between various units 222, 224, 230, 232, 234 is implemented over a fixed cable connection.

The memory unit 234 has stored therein predetermined limit values for each quantity to be measured and, when an exceeding of limit value is indicated by measurement data coming from a sensor, the analyzing application 244 determines whether operation of the fan motor 220 is to be regulated thereby. The limit values determine whether the output power (rotation speed) of the fan motor 220 is continued to be maintained the same, whether it is reduced or increased.

Limit values can be preset e.g. for temperature, such that, when the temperature of exhaust air falls to below 20° C., the control unit 222 is directed by the controller 126 to reduce output power of the fan motor 220 for reducing draft in the building's 351 apartments. On the other hand, if the temperature of exhaust air exceeds 23° C., the control unit 222 is directed by the controller 126 to increase output power of the fan motor 220 for enhancing ventilation and, if the temperature of exhaust air is with the range of 20-23° C., the current output power of the fan motor 220 will be maintained. The same applies also to other quantities to be measured. In addition, the controller 126 is capable of establishing the need of enhancing or reducing ventilation based on measurement data for two or more measured quantities on the basis of preset limit values.

In addition, the analyzing application 244 is capable of determining a demand for ventilation on the basis of measurement data for two or more measured quantities. E.g. the analyzing application 244 is capable of detecting a fire in the building 351 from exhaust air by analyzing measurement data coming from VOC, carbon dioxide, temperature and humidity sensors and, based on the analysis, the controller 126 directs the control unit 222 to enhance operation of the fan motor 220 for removing smoke. Moreover, after detecting a fire, the controller 126 is able to deliver information thereof in a wireless manner by way of the data transfer unit 230, i.e. to send a fire alarm, to some other external terminal device.

The exhaust air blower 100 may have its operation monitored and/or controlled in real time over a wireless connection by means of a terminal device, e.g. a desk or portable computer or a smart phone, using browser-based control software intended for controlling the exhaust air blower 100. By means of the terminal device's control software it is possible to monitor operation of the exhaust air blower 100, or several exhaust air blowers 100, by examining measurement data coming from various sensors of the controller 126 and analysis data constructed on the basis thereof, to obtain messages, e.g. a fire alarm, and to control manually operation of the exhaust air blower(s) 100.

Figure 3:
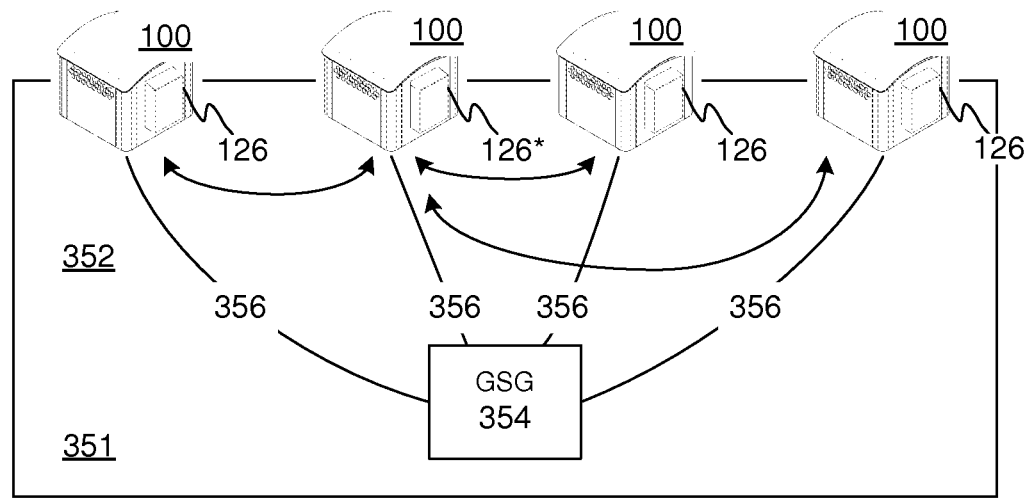
FIG. 3 shows a principle view of the exhaust air system

FIG. 3 illustrates the building's 351 exhaust air system 352, comprising several exhaust air blowers 100 as shown in the preceding figures and updated with the controller 126.

The system 352 further comprises a distribution board 354, which is by way of power supply cables 356 in communication with each exhaust air blower 100.

It is in the system 352 that the exhaust air blowers 100, i.e., in practice, the controllers 126 thereof, communicate with each other by means of the data transfer units 230 in a wireless manner and the controller 126 (denoted with asterisk) of one exhaust air blower 100 functions as a main controller through which all other controllers 126 transmit information to an external terminal device and through which they also receive information by means of which they are controlled.

The invention claimed is:

1. A retrofittable controller for a building's exhaust air blower, comprising
    a processor unit,
    a data transfer unit,
    a memory unit,
    a sensor unit comprising at least one sensor adapted to measure exhaust air arriving at the exhaust air blower,
    a control unit adapted to regulate operation of a fan motor on the basis of a measurement conducted by the at least one sensor,
    a protective housing inside which the controller's units are installed, and
    an attachment element adapted to fasten the controller to a safety cage of the exhaust air blower, wherein the protective housing comprises an air inlet duct, which protrudes therefrom and is intended to be fitted inside the exhaust air blower's safety cage, and by means of which a portion of the exhaust air arriving at the exhaust air blower is conducted into the protective housing to be analyzed by the sensor unit, the air inlet duct is provided with an air intake for directing analysis-bound exhaust air along the air inlet duct into an interior of the protective housing, and the protective housing is provided with a discharge outlet for removing analyzed air from inside the protective housing.

2. The controller according to claim 1, wherein the air intake is disposed on a bottom surface of the air inlet duct.

3. The controller according to claim 1, having its air inlet duct split with a dividing element so as to make up an air inlet section intended for conveying the analysis-bound exhaust air into an interior of the protective housing and a cable section for extending into an interior of the safety cage at least one sensor's measuring tubes and a connection cable for controlling the fan motor.

4. The controller according to claim 1, wherein the attachment element is made up by edge strips provided on the protective housing, the attachment made therethrough being used for fastening the protective housing to the safety cage.

5. The controller according to claim 1, which comprises a shielding shell, which is attachable to the safety cage and mountable on top of the protective housing, and which comprises at least one adjustable air vent for removing, from inside the shielding shell, the air flowing between the protective housing and the shielding shell, edge strips intended for fastening the shielding shell to the safety cage, and a roofing.

6. A control method for regulating a building's exhaust air blower with a retrofittable controller comprising:

providing the retrofittable controller according to claim 1, measuring, with at least one sensor of a sensor unit, the exhaust air arriving at the exhaust air blower and regulating, with a control unit, the operation of a controller-coupled fan motor of the exhaust air blower on the basis of a measurement conducted by at least one sensor.

7. A computer program, which comprises instructions enabling a computer to execute steps of the method according to claim 6 as the program is run on the computer.

8. A computer program product, which comprises the computer program according to claim 7 stored therein.

* * * * *